United States Patent [19]

McDowell

[11] Patent Number: 4,736,217
[45] Date of Patent: Apr. 5, 1988

[54] CAMERA PLATFORM FOR TRIPOD MOUNTING

[76] Inventor: Lane C. McDowell, 27842 N. 204th St., Wittmann, Ariz. 85361

[21] Appl. No.: 44,020

[22] Filed: Apr. 29, 1987

[51] Int. Cl.⁴ ............................................. G03B 29/00
[52] U.S. Cl. ......................................................... 354/81
[58] Field of Search ..................................... 354/81, 82

[56] References Cited

U.S. PATENT DOCUMENTS

| | | | |
|---|---|---|---|
| 4,329,041 | 5/1982 | Madge et al. | 354/293 |
| 4,422,745 | 12/1983 | Hopson | 354/105 |
| 4,545,660 | 10/1985 | Rudolf | 354/82 |
| 4,574,651 | 3/1986 | Nordstrom | 74/471 |
| 4,673,268 | 6/1987 | Wheeler et al. | 354/81 X |

*Primary Examiner*—Michael L. Gellner
*Attorney, Agent, or Firm*—Warren F. B. Lindsley

[57] ABSTRACT

A camera platform for mounting a camera on a tripod, the platform incorporating means for leveling the camera and for directing the camera vertically or horizontally. Directional means comprises two pivots, one for pan and one for elevation, each incorporating controlled rotational resistance elements and push-button controlled power operated braking mechanisms, the push buttons being incorporated together with a shutter control button in a handgrip at the end of a control arm.

12 Claims, 3 Drawing Sheets

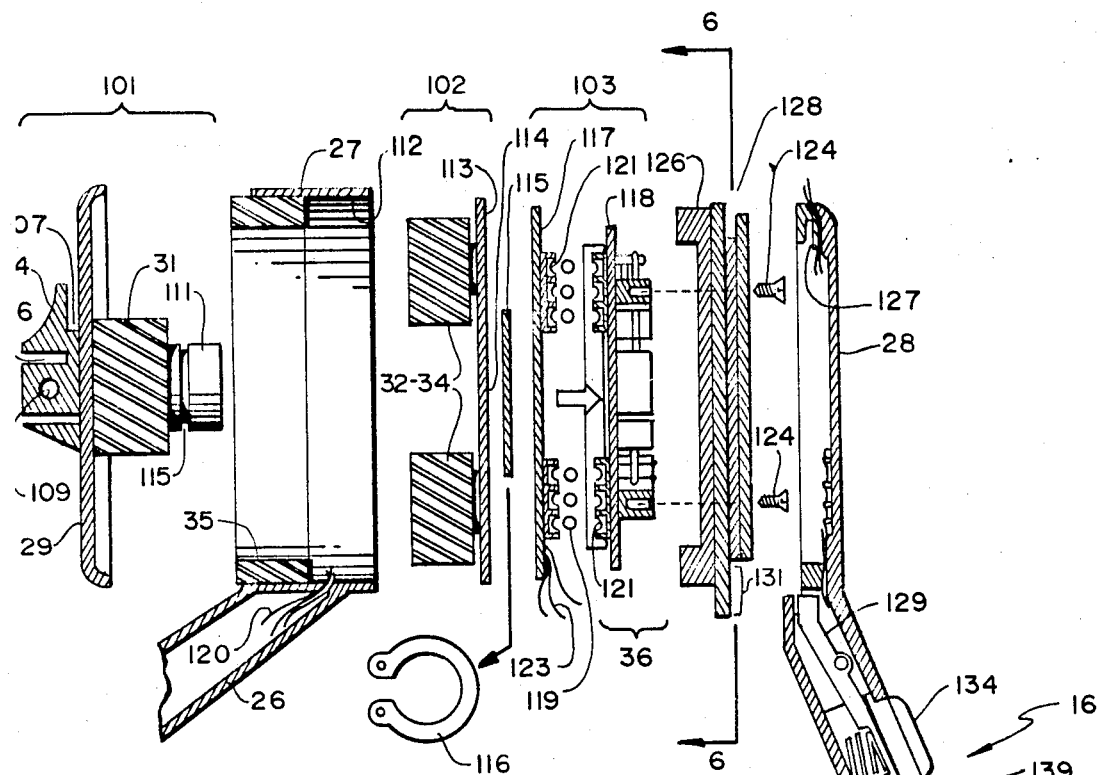

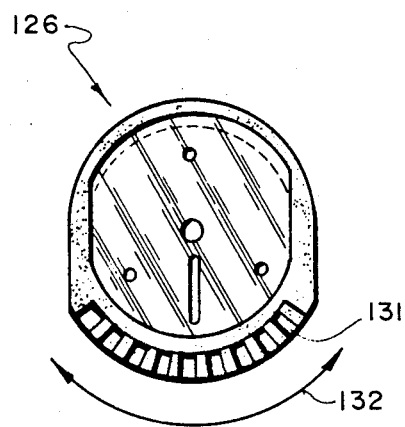
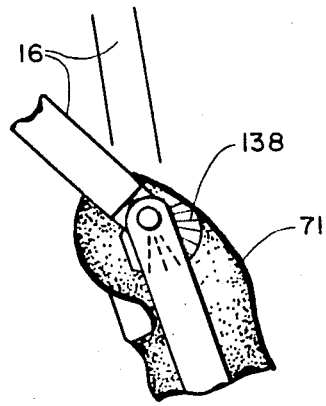
Fig.6    Fig.7
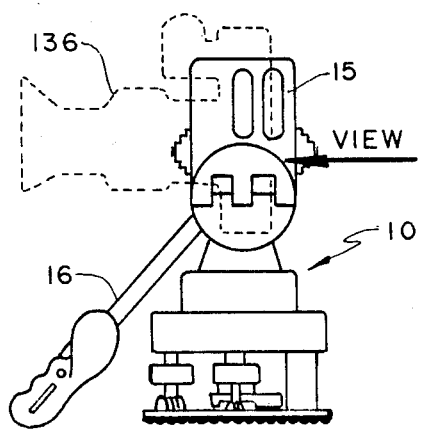
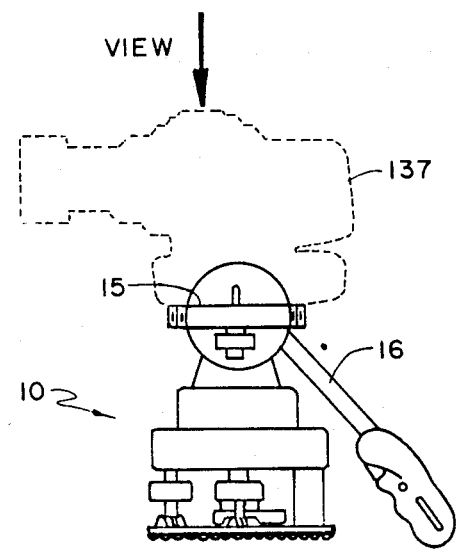
Fig.8    Fig.9

CAMERA PLATFORM FOR TRIPOD MOUNTING

BACKGROUND OF THE INVENTION

Tripods are frequently employed as stable supports for cameras of various types. The camera is typically mounted upon an intermediate platform incorporating means for leveling the camera and for directing the camera vertically and horizontally.

For action pictures, it is frequently necessary to follow the action or the intended subject with the camera until the desired action occurs or until circumstances are right for a good picture. When the brief moment occurs for a particularly good shot, the camera must be in the proper position, and the finger must be on the shutter release, or the opportunity is lost forever.

Prior art means for directing the camera under such circumstances are basically of two types. One type employs a ball and socket arrangement; the other incorporates separate adjustments about three axes.

The ball and socket type, in unlocked mode, provides freedom for rapid directional changes in elevation or in pan (left and right) as needed for tracking a diagonally moving subject, but it also frees the camera to tilt inadvertently out of level, and to switch from locked down to tracking mode, one or two levers must be unlocked manually.

In the type of mechanism incorporating the three separate adjustments, the camera is leveled once and is locked into the leveled position by means of a hand-tightened brake. To switch from a locked down camera position to tracking a diagonally moving subject, however, both the elevation and pan control levers must be unlocked manually.

For a measure of smooth camera motion while panning, a controlled resistance is provided in some movie camera mounts to reduce erratic rate of rotation about the two axes, which results in a noticeably rough transition. The resistance may be provided by causing oil to be forced through a small hole as the platform is rotated, or by using frictional plates in contact with each other.

The difficulty with such prior art arrangements when used for action photography arises from the need for numerous, virtually simultaneous adjustments and operations. In order to manipulate the control knobs or levers associated with the individual directional axes, the photographer must release a hand from its hold on the lens barrel, camera body or grip and move it to the knob or lock lever on the tripod head. In the case of a still photographer shooting an erratically moving subject (children, animals, sports), either the left hand must be removed from the lens barrel (interrupting focus and aperture adjustments) or the right hand must be removed from the shutter trigger. Under certain circumstances, it might be desirable to have the camera locked into position, but if it suddenly becomes necessary to track a moving subject, the situation then calls for a rapid succession of adjustments including the unlocking of the directional axes, last minute focus and framing (composition) readjustments and the timely operation of the shutter trigger.

Physical control of the camera in conjunction with one of the foregoing camera mounts is aided by means of a handgrip on an arm projecting some distance from the camera head. The hand grip is used for directing the camera. A shutter trigger is sometimes incorporated on the handgrip for additional convenience.

While such features have provided some relief from the difficulties described earlier, inconvenience and time delay involved in the locking and unlocking of the pan and elevation brakes remains, affecting performance.

DESCRIPTION OF THE PRIOR ART

Various types of controls and convenience features involving the operation of a camera are disclosed in the prior art.

The devices described in U.S. Pat. Nos. 4,329,041 and 4,545,660 are intended for use with hand-held cameras and provide only shutter-activating triggers.

U.S. Pat. No. 4,329,041 employs a pistol grip that may be attached to the bottom or to the side of the camera body. A shutter release button is incorporated in the grip in a position permitting its operation in the customary manner by the index finger.

U.S. Pat. No. 4,545,660 comprises a small bipod camera support with retractable legs. The camera is clutched in the hands with the bipod pressed against the chest for an added measur of stability.

U.S. Pat. No. 4,422,745 discloses a microprocessor controlled camera for taking school portraits. The camera has its own support structure and does not employ tripod mounting. The camera system includes an elevator assembly for raising and lowering the camera in response to a control actuator. A keyboard serves as the control device for activation of the shutter and entr of data concerning the subject.

U.S. Pat. No. 4,574,651 discloses a device comprising a control stick intended primarily for use in a fighter aircraft for use in controlling a large number of aircraft and weapons operations. A dozen or more control buttons are incorporated in the handgrip of the device.

SUMMARY OF THE INVENTION

In accordance with the invention claimed, an improved camera platform is provided for mounting a camera upon a tripod, wherein the platform incorporates means for leveling the camera and for directing the camera vertically and horizontally. A pistol grip positioned at the distal end of a control arm which is employed to move the camera directionally, incorporates control buttons to lock or release brakes associated with directional pivots and to trigger the camera shutter.

It is, therefore, an object of the present invention to provide an improved camera platform for tripod mounting, the platform incorporating means permitting rapid control of pan and elevation pivots and not requiring removal of the hands from the camera grip, the shutter trigger, or from the aperture and focus controls.

A further object of this invention is to provide in such a platform convenient means for leveling the camera, which means shall be independent of the pan and elevation pivots so as not to be disturbed by pan and elevation adjustments.

A still further object of this invention is to provide in such a platform separate pan and elevation pivots that incorporate controlled pivotal resistance mean to permit smooth control of camera direction and minimize erratic (jerky) camera motion during directional adjustments.

A still further object of this invention is to provide in such a platform electrically actuated brakes which secure the pan and elevation positions and which are responsive to control by means of control buttons.

A still further object of this invention is to provide with such a platform a control arm with a handgrip at its distal end for control of camera direction and shutter operation.

A still further object of this invention is to provide such a platform in which the pan and elevation brake controls together with the shutter trigger are conveniently positioned on the handgrip for operation by the fingers of the hand holding the grip.

A still further object of this invention is to provide such an improved camera platform in a form that accommodates different types of small and medium format cameras in either vertical or horizontal positions.

A still further object of this invention is to provide such an improved camera platform in a form that accommodates cameras with viewfinders requiring different viewing stances while affording a comfortable operator position in each case.

Yet another object of this invention is to provide such an improved camera platform in a compact and attractive form that will readily be accepted by users of tripod mounted cameras.

BRIEF DESCRIPTION OF THE DRAWINGS

The present invention may be more readily described with reference to the accompanying drawings, in which:

FIG. 4 is an electrical wiring diagram of the camera platform;

FIG. 5 is an exploded view of a portion of the camera platform of the invention;

FIG. 6 is a plan view of one of the parts of the mechanism of FIG. 5 that is employed to hold the control arm of the camera platform in a desired angular position;

FIG. 7 illustrates the capability of the handgrip to be adjusted at another angle; and FIGS. 8 and 9 are side views of the camera platform in use, illustrating its capability for accommodating different types of cameras.

DESCRIPTION OF THE PREFERRED EMBODIMENT

Figure 1:
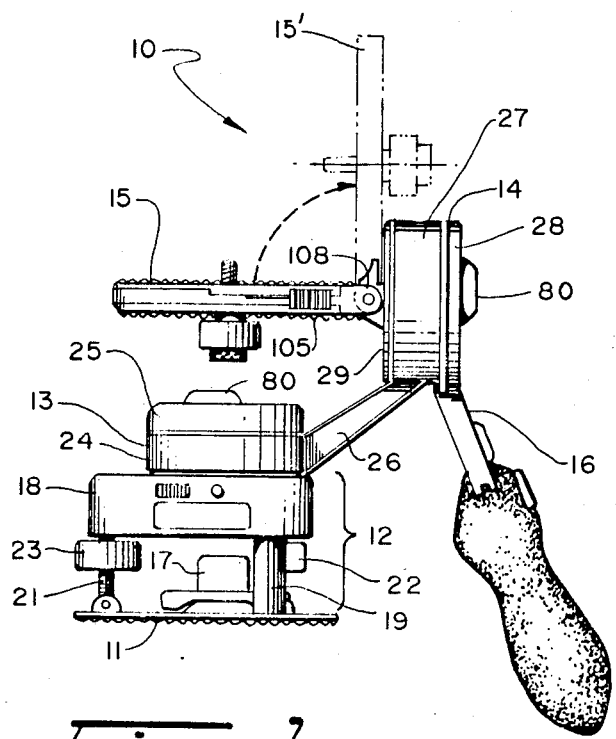
FIG. 1 is a perspective view of the improved camera mounting platform of the invention as seen from the operator's side of the platform.

Referring more particularly to the drawings by characters of reference, FIGS. 1-9 disclose an improved camera mounting platform 10 embodying the invention and comprising a base plate 11, a leveling mechanism 12, a pan pivot 13, and elevation pivot 14, a camera bracket 15, and a control arm 16.

Base plate 11 is attached to the top of a tripod (not shown) by means of a knob or wing nut 17 positioned at its center.

Leveling mechanism 12 comprises a triangular frame 18 enclosed about its periphery to conceal portions of the leveling structure. Supporting frame 18 comprises three legs, each positioned one at each of its three corners. The legs comprise a pivot post 19 of nonadjustable height and two identical adjustable legs 21 and 22, as shown in FIG. 1, wherein leg 22 is partially obscured by leg 19.

Pivot leg 19 is rigidly mounted upon base plate 11. Its top end is pivotally secured to frame 18 by means of a pivot joint (not shown) that pivots about two axes that are sixty degrees apart. Legs 21 and 22 are screw jacks, their heights being adjustable by means of a knurled rim or grip 23 that surrounds the lower end of the upper female portion of the screw jack assembly. The upper extremities of legs 21 and 22 are pivotally secured to frame 18 by a ball-and-sockettype attachment. A change in the height of leg 21 causes frame 18 to tilt or pivot about one axis of the pivot joint atop leg 19, while a change in the height of leg 22 causes frame 18 to pivot about the other axis of the pivot joint.

Frame 18 houses batteries which actuate braking mechanisms incorporated in the pan and elevation pivots 13 and 14, respectively. It also supports pan pivot 13 on its top surface. Two bubble levels set at right angles to each other (not shown in the drawing) are mounted on the top surface of frame 18.

Pan pivot 13 has the form of a short cylinder or disc comprising a rotatable lower shell 24 and a stationary cap 25.

A hollow support ar 26 projects angularly outwardly and upwardly from one side of shell 24, supporting at its extremity elevation pivot 14.

Pivot 14 is similar to pivot 13, having a shell 27 and a cap 28 corresponding, respectively, with shell 24 and cap 25 of pivot 13. In the case of pivot 14, however, cap 28 is rotatable by means of control arm 16, while shell 27 has its one side rigidly attached to the upper end of arm 26. As cap 28 is rotated, a plate 29 at the base of pivot 14 rotates with cap 28. Camera bracket 15, supported by plate 29, rotates with cap 28 and plate 29.

As shown in FIG. 1, the orientation of pivot 14 is 90 degrees displaced from pivot 13, pivot 13 providing rotation about its vertical axis to afford directional capability to the left or right (pan) while pivot 14 is rotatable about its horizontally positioned axis to provide an upward or downward (elevation) directional capability. Because camera bracket 15 is supported by pivot 14 and pivot 14, in turn, is supported and carried rotationally by pivot 13, a camera mounted upon bracket 15 is directable in both the pan and elevation modes.

Figure 2:
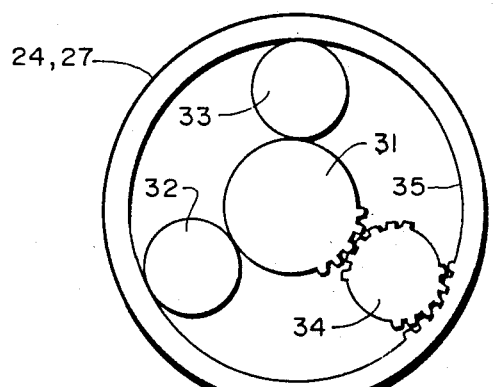
FIG. 2 is a simplified top view of the planetary gear arrangement incorporated in the pivot mechanisms of FIG. 1.

In order to afford smooth camer movement, it is necessary to incorporate in the pan and elevation pivots 13 and 14 a controlled rotational resistance. In the absence of such resistance, camera motion, controlled by hand, can be erratic, and it will be found difficult to direct the camera smoothly while following a moving object. A set of planetary gears is incorporated in each of pivots 13 and 14 to provide both smooth resistance and stable (planar) rotational motion. As shown in FIG. 2, the planetary gear comprises a sun gear 31, three planet gears 32, 33 and 34 and a ring gear 35.

In the case of pivot 13, ring gear 35 is secured to shell 24 and sun gear 31 is secured to the top surface of frame 18 of leveling mechanism 12. Thus, as shell 24 is rotated under the urging of control arm 16, ring gear 35 is caused to rotate about sun gear 31 to which it is coupled by planet gears 32-34. The planetary gears 31-35 are packed with a thick grease, and a smooth rotational resistance is thereby produced. One element of the tightly connected gear set is attached to the rotating part of the pivot case, another gear element attached to the stationary part of the pivot case, providing planar (wobble free) rotational movement. A similar arrangement provides the desired rotational resistance and planar stability in pivot 14.

Figure 3A:
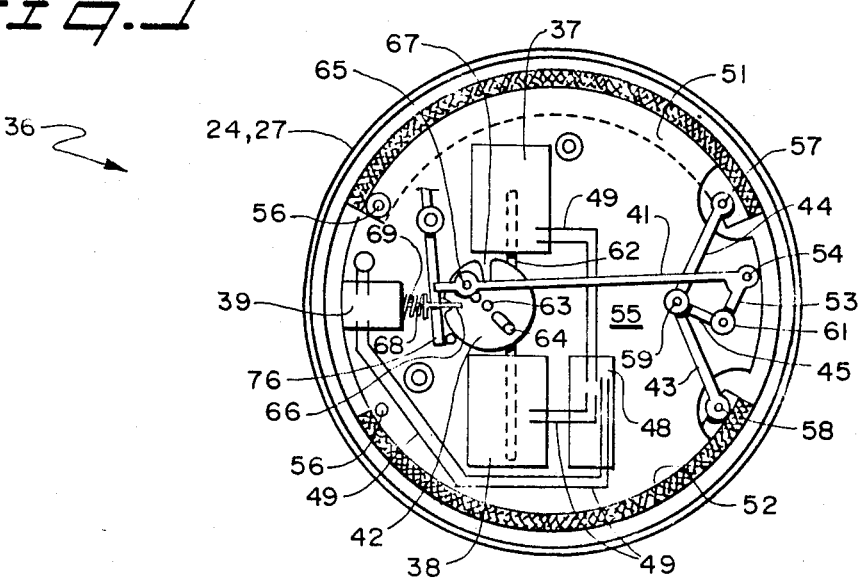
FIGS. 3A-3C illustrate the operation of the braking mechanism incorporated in the camera platform of the invention.

FIG. 3A illustrates a power braking mechanism and associated manual override mechanisms that are incorporated in both of the pivots 13 and 14.

As shown in FIG. 3A, the power braking mechanism 36 comprises brake actuating solenoids 37 and 38, locking solenoid 39, actuator lever 41, cam 42, coupling levers 43, 44 and 45 and transfer switch 48. Electrical wiring 49 interconnects the solenoids 37-39 and switch 48. The braking mechanism 36 drives tw brake shoes 51 and 52 into frictional contact with the cylindrical inside surface of shell 24 or 27, respectively, of pivot 13 or 14.

Actuator lever 41 is an elongated bar with a rocker arm 53 extending angularly from one end. At the end from which rocker arm 53 extends, lever 41 is pivotally secured by means of a pivot pin 54 to a base plate 55 which supports braking mechanism 36.

The brake shoes 51 and 52 are positioned about the top and right-hand portions, respectively, of shell 24 or 27. Their left-hand ends are pivotally secured to base plate 55 by pivot pins 56. At their right-hand ends, shoe 51 is pivotally attached to one end of lever 44 by pin 57, and shoe 52 is pivotally attached to one end of lever 43 by pin 58. The opposite end of lever 45 is pivotally attached to the distal end of rocker arm 53 by a second floating pivot pin 61. In the position of the levers 43 and 44, shown in FIG. 3A, they meet angularly at pin 59. If pin 59 is by some means moved to the right in a direction that tends to force levers 43 and 44 into linear alignment, their outer ends which are pivotally coupled to brake shoes 51 and 52 are forced apart, driving the shoes against the shell 24 or 27, the resulting frictional contact constituting the braking action.

Lever 41 with its rocker arm 53 which is coupled to pivot pin 59 by lever 45 is arranged to drive pin 59 to the right and thereby to set the brakes when the left-hand end of lever 41 is moved downward. It will be noted that as the left-hand end of lever 41 moves downward, pivoting about pin 54, the distal end of arm 53 rotates counterclockwise moving pivot pin 61 to the right, carrying with it lever 45 and pin 59 to produce the desired braking action. When the left-hand end of lever 41 is moved upward, the motions just described are reversed so that pin 59 moves leftward and the shoes 51 and 52 are moved away from shell 24 or 27 to release the braking action.

Solenoids 37 and 38 are aligned with each other at opposite ends of a common armature bar 62. In the view of FIG. 3A, solenoid 37 is shown directly above solenoid 38. When solenoids 37 and 38 are electrically energized, one at a time, the common armature bar 62 is drawn toward the solenoid that is energized. Thus, when solenoid 37 is energized, bar 62 moves upward and when solenoid 38 is energized, the bar moves downward.

Cam 42 couples the armature bar 62 to the lefthand end of lever 41. Cam 42 is generally circular, and is rotationally mounted at its center to base plate 55 by means of a pivot pin 63. Two radially oriented slots are provided in cam 42 directly opposite each other. A pin 64 that projects from armature bar 62 engages one slot, and a pin 65 that projects from the left-hand end of brake actuating lever 41 engages the other slot. Because pin 64 and the slot it engages are to the right of pin 63, an upward motion of bar 62 causes cam 42 to rotate counterclockwise, moving pin 65 and the left-hand end of lever 41 downward to set the brakes, while a downward motion of bar 62 causes cam 42 to rotate clockwise moving lever 41 upward to release the brakes. The brakes are thus seen to be set when solenoid 37 is energized to move bar 62 upward, and they are released when solenoid 38 is energized to mov bar 62 downward.

Transfer switch 48 is a special type of switch that receives a DC voltage at its input terminals, and supplies it to one of two sets of output terminals. Each time switch 48 is energized after an interruption of the supply voltage, it supplies voltage to the set of output terminals that were not energized previously. Solenoid 37 is connected to one set of output terminals; solenoid 38 is connected to the other. Thus, if voltage is supplied to switch 48 intermittently, solenoids 37 and 38 will be energized alternately, thereby setting and releasing the brakes.

If voltage is supplied to switch 48 by means of a momentary push-button switch, the brakes will only remain set as long as the switch is held closed. In a more desirable mode of operation, the brakes should be set by a momentary operation of the switch and they should remain set until there is a second momentary operation of the switch. This mode of operation is realized through the addition of the locking solenoid 39 and a further modification of cam 42.

The required modification of the cam 42 is the addition of two indentations, one on either side of the slot that engages pin 65. The first of these indentations, here identified as slot 66, is located counterclockwise of pin 65, the second indentation, or slot 67, is located clockwise of pin 65. Solenoid 39, with its armature 68, is arranged so that when armature 68 is extended, its tip will ride upon the periphery of cam 42 so that as cam 42 is rotated, the tip of armature 68 will enter either of the slots 66 or 67 as it moves into alignment. When slot 67 is engaged in this manner, the brakes are held in the set or braking condition, and when slot 66 is engaged, the brakes are held in the released condition. The armature 68 is biased in an extended position by a spring 69 so that when solenoid 39 is not energized, spring 69 drives armature 68 outwardly to engage one of the slots 66 or 67, and when solenoid 39 is subsequently energized, the armature is withdrawn against the force of the spring.

Assuming the braking mechanism 36 is initially in the brake-set condition, operation of the mechanism now occurs as follows: If a push-button switch supplying a DC voltage to the mechanism is closed momentarily, solenoids 39 and 38 are both energized. Solenoid 39 withdraws its armature unlocking cam 42, and solenoid 38 moves armature 62 downward to release the brakes. As the momentary switch is released, armature 68 is driven outward by spring 69 to engage slot 66 and hold the brakes in a released condition. The next time the push button is momentarily closed, solenoid 39 again withdraws its armature to unlock cam 42. By virtue of the alternating action of switch 48, solenoid 37 is this time energized to move armature 62 upward, thereby moving the braking mechanism to the set or braking condition. As the push button is again released, solenoid 39 releases its armature and spring 69 drives the tip of armature 68 into slot 67 to lock the brakes into the set condition again.

A braking mechanism as just described, is incorporated in each of the pivots 13 and 14, and the corresponding push-button switches (one for each of the mechanisms) are located in the handgrip 71 at the end of control arm 16.

Figure 3B:
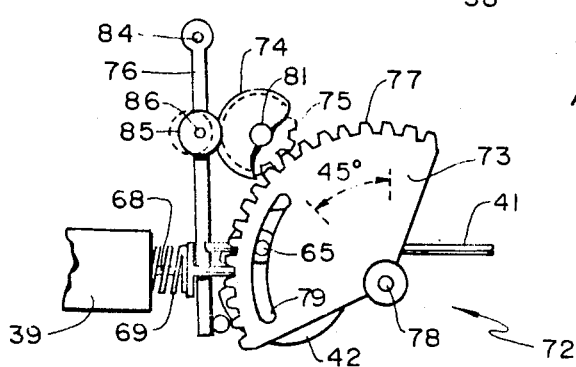

In the event of a depleted battery or a jammed braking mechanism, it is desirable to have a manual override capability. A manual override mechanism 72 is provided for such an eventuality. As shown in FIG. 3B, the mechanism 72 comprises an actuating gear 73, a lock release cam 74 and associated drive gear 75, and a lock release lever 76. Lock release lever 76 is also shown in FIG. 3A.

Actuating gear 73 comprises a circular sector of approximately 140 degrees with teeth disposed about its arcuate edge 77. The rotational center of gear 73 is pivotally secured to base plate 55 or pivot cap 25 by means of a pivot pin 78 at a point near the center of base plate 55. An arcuate slot 79 in gear 73 near the toothed edge 77 with its center of curvature at pin 78, engages pin 65 of brake actuating lever 41. A manual operator lever 80 for operation of the manual override mechanism 72 is directly coupled to gear 73.

Gear 75 and cam 74 are mounted, one over the other, on a common shaft 81 that is mounted on base plate 55. The teeth of gear 75 engage those of gear 73 in a ratio such that gear 75 is rotated four degrees for each degree of rotation of gear 73.

Figure 3C:
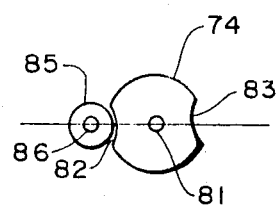

Cam 74 is circular as shown in FIG. 3C, with two indentations 82 and 83 in its periphery, displaced 180 degrees from each other. Cam 74 is fixed to gear 75 so that gear 75 and cam 74 rotate together.

Lock release lever 76 is pivotally mounted to base plate 55 at one end by means of a pivot pin 84. Its opposite end bears against the distal end of spring 69 of solenoid 39. A roller 85 operating upon a shaft 86 that extends from lever 76 at a point between its pivot pin 84, and its engagement with spring 69 engages the periphery of cam 74.

In the illustration of FIG. 3B, the armature of solenoid 39 is extended and engaging slot 66 of cam 42 holding the braking mechanism 36 in the released condition. To manually set the braking mechanism, the manual operator lever 80 is rotated in a counterclockwise direction, causing gear 73, as shown in FIG. 3B, to rotate in a counterclockwise direction. During the first few degrees of rotation of gear 73, which cause gear 75 and cam 74 to rotate in a clockwise direction, roller 85 moves out of indentation 82 so that lever 76 is pivoted away from cam 74 and is driven against spring 69 to drive armature 68 out of engagement with cam 42, unlocking braking mechanism 36. As gear 73 continues its counterclockwise rotation, the upper end of slot 79 reaches pin 65, and further rotation of gear 73 moves lever 41 downward to set the braking mechanism. Rotation of gear 73 is terminated after 45 degrees of rotation at which time gear 75 and cam 74 have been rotated through 180 degrees whereupon roller 85 drops into indentation 83 of cam 74 freeing spring 69 to drive armature 68 into engagement with slot 67 of cam 42 and thereby locking the braking mechanism 36 in the set condition.

If lever 80 is now rotated 45 degrees clockwise, the above sequence is reversed with the lower extremity of slot 79 driving lever 41 upward to release the braking mechanism and returning roller 85 to indentation 82 to lock the braking mechanism in the released condition.

The electrical wiring involved in the camera platform 10 is shown in FIG. 4. As mentioned earlier, the battery 87 is mounted in frame 18 of leveling mechanism 12. Control switches in the form of push-button switches that close momentarily when depressed, are located in the handgrip 71A or 71B as shown in FIG. 4. The control switches include a shutter release push-button switch 88, a pan pivot brake control push-button switch 89 and an elevation pivot brake control push-button switch 91. Each of the three push buttons 88, 89 and 91 has a first terminal connected to a first terminal of battery 87, these connections being represented by electrical cable 92. The other terminal of each push-button switch is wired to the associated control mechanism. Thus, shutter control switch 88 has its second terminal connected by a wire 93 to a first terminal of the shutter control mechanism, elevation pivot brake control switch 91 has its second terminal connected by a wire 94 to a first terminal of the brake control mechanism 36 of elevation pivot 14, and pan pivot brake control switch 89 has its second terminal connected by a wire 95 to a first terminal of the brake control mechanism 36 of pan pivot 13. Second terminals of the shutter control mechanism, the elevation pivot brake control mechanism and the pan pivot brake control mechanism are connected to the second battery terminal by wires 96, 97 and 98, respectively.

FIG. 4 shows different arrangements of the switches 88, 89 and 91 in two versions 71A and 71B of the handgrip 71. Handgrip 71A represents a trigger for a still camera version of the camera platform, and handgrip 71B represents a trigger arrangement for a video or movie camera version. In both versions, the pan and pivot control switches 89 and 91 are placed for convenient access by the fingertips. In the still camera version of the handgrip 71A, the shutter control switch 88 is also placed for fingertip control, but in the video or movie camera version, the shutter control switch is placed in an out-of-the-way location 88A or 88B, where it will not accidentally be turned off during the use of the grip for moving the camera. The handgrip is specially contoured so that it may be held or gripped between the thumb and first knuckle of the index finger, and between the palm and first segments of the fingers, leaving the ends (last two joints) of the fingers relaxed. This grip provides adequate control of camera movement while the distal segments of the fingers remain relaxed and ready to tap a push button. Other camera controls such as zoom, focus and meter activation can also be incorporated in the grip 71.

It will be noted, that the electrical wiring as shown in FIG. 4, passes between elements of the camera platform that rotate relative to each other. While such relative motion might be accommodated by a flexible electrical cable, it is preferable with respect to long ter reliability and operating life to incorporate a system of slip rings for making the electrical connections between the various moving parts. The adaptation of a ball bearing assembly for this purpose is illustrated in the exploded view of the elevation pivot and control arm assemblies shown in FIG. 5. The ball bearing races also add to smooth rotational motion of the axes.

The assembly of FIG. 5 comprises a camera bracket support 101, shell 27, planet gear assembly 102, ball bearing assembly 103, braking mechanism 36, cap 28, slip ring structure 126 and control arm 16.

Camera bracket support 101 incorporates a bracket 104 that serves as a pivotal mount for camera bracket 15, which may be locked into the horizontal position shown in FIG. 1, or into the vertical position shown by the broken line representation 15'. A spring loaded latch (not shown) coupled to a control bar 105 engages slot 106 of bracket 104 in the horizontal position, and it engages slot 107 in the vertical position to lock the bracket 15 in the desired position. Bracket 15 pivots up and down about a pivot pin 108, operating in a horizontal hole 109 of bracket 104. Bracket 104 extends from the center of circular plate 29, which also carries on its opposite or inside surface, shaft 111 upon which sun gear 31 is mounted. Bracket 104, plate 29, shaft 111 and sun gear 31 are rigidly secured together or integrally formed, so that none of the various parts of support 101 moves with respect to any other of its parts.

Ring gear 35 is fixed to the inside surface of shell 27 at one end thereof, leaving the inside surface 112 at the opposite end clear for use as a braking surface upon which brake shoes 51 and 52 are operative.

Planet gear assembly 102 comprises the three planet gears 32-34 rotatably mounted to a circular plate 113 with a centered opening 114 that provides clearance for the passage of sun gear shaft 111. When bracket support 101 with gear 31 and shaft 111 are installed in shell 27 together with planet gear assembly 102, planet gears 32-34 engage the ring gear 35 as well as sun gear 31, and shaft 111 passes through opening 114 of plate 113 with its annular groove 115 just protruding through opening 114. These assembled parts are secured in the above described position by a clip or snap ring 116 that is pressed into groove 115.

Ball bearing assembly 103 comprises first and second race assemblies 117 and 118, and the ball bearings 119 that operate therein. Each of the race assemblies 117 and 118 comprises a set of concentric circular races 121 mounted upon a circular plate. The races 121 of assembly 117 mate with corresponding races 121 of assembly 118 to carry cooperatively the ball bearings 119. The races 121 carry the wires 123 that must pass from control arm 16 and pivot 14 to other parts of platform 10, via the electrical connection being made at each side to the races and the circuit completed from race to mating race by ball bearings 119 operating therein.

The assembly of pivot 14 is completed by first passing the protruding end of shaft 111 of sun gear 31 through a centered clearance opening in race assembly 117 and then rigidly securing the end of shaft 111 to the center of race assembly 118 by means of screws (not shown). Race assembly 118 is integral with or rigidly secured to braking mechanism 36, and slip ring structure 126 is secured to brake mechanism 36 by screws 124. Control arm 16 is adjustably secured to slip ring structure 126 in a manner yet to be described.

In the completed assembly as just described, control arm 16, cap 28, braking mechanism 36, race assembly 118 and camera bracket support 101 move as a unit within shell 27. Race assembly 117 is rotationally stationary with respect to shell 27. As bracket support 101 with sun gear 31 is rotated, the engagement of sun gear 31 with planet gears 32-34 causes planet gears 32-34 to rotate and consequently to be rotated about ring gear 35. The interlocked gears, and the heavy grease in which they are packed, provides the controlled rotational resistance and stable (planar) rotational motion that is essential to the proper operation of pivot 14. At the same time, as race assembly 118 rotates with respect to stationary race assembly 117, electrical connections between the two moving race assemblies remain intact by virtue of electrical contact through ball bearings 119 as they move about the races.

Electrical wiring 120 from pivot 14 is routed through the hollow interior of support arm 26 where it is interconnected with the braking mechanism of pivot 13.

The structure of pivot 13 is very similar to that of pivot 14, there being incorporated therein the planetary gear structure, the same type of braking mechanism, and the ball bearing assembly for the coupling of electrical connections.

Controlled pivotal tracking capabilities with push-button controlled braking are thus afforded about two axes, pivot 13 serving for the pan adjustments and pivot 14 for elevational adjustments.

Control arm 16, as shown in FIG. 5, comprises a hollow metal frame 125 extending from the lower edge of a cap 28. Handgrip 71, which is molded in rubber or neoprene to fit the hand in its intended use, covers the lower end of arm 16. The hollow interior of frame 125 carries the electrical wiring from the push-button switches 88, 89 and 91 to pivot 14.

Cap 28 incorporates in the underside of its circular periphery an annular tongue-and-groove configuration 127 which engages a mating tongue-and-groove configuration 128 incorporated in the periphery of slip ring structure 126. These mating tongue-and-groove configurations rotationally secure arm 16 to slip ring structure 128. A spring-loaded latch 129 engages teeth 131 arranged about the periphery of an extending rim 132 at the lower edge of slip ring structure 126 to fix the rotational position of arm 16. Latch 129 is held in engagement with teeth 131 by a spring 133, and is released by thumb pressure applied to a release button 134.

As evident from the broad sector of rim 132 covered by teeth 131, the angle of arm 16 is adjustable over a wide range. The utility of the wide adjustment range is illustrated in FIGS. 8 and 9, which show the camera mount 10 of the invention is use with two different types of cameras as seen from the side of the camera in each case. In FIG. 8, the control arm 16 is set to a forward position to accommodate a camera 136 with viewfinder at the rear, the forward position providing greater comfort to the user in this case. FIG. 9 shows the arm 16 set to a rearward position for use with a camera 137 that has its viewfinder on the top of the camera. FIGS. 8 and 9 also show the two positions of camera bracket 15. In FIG. 8, the bracket 15 is turned to its vertical position; in FIG. 9, it is turned down to its horizontal position.

As shown in FIG. 7, the angle at which handgrip 71 extends from the end of control arm 16 is also adjustable. A latch and tooth mechanism similar to that described earlier (involving latch 129 and teeth 131) is employed, the teeth 138 being provided at the end of arm 16 where handgrip 71 is pivotally attached. An associated spring 139 and release button 141 are shown in FIG. 5.

An improved camera platform for tripod mounting is thus provided in accordance with the stated objects of the invention, and although but a number of embodiments of the invention have been illustrated and described, it will be apparent to those skilled in the art that various changes and modifications may be made therein without departing from the spirit of the invention or from the scope of the appended claims.

What is claimed is:

1. A control device for mounting a camera actuatable by one hand for controlling a plurality of functions comprising:
   a mounting bracket for supporting a camera,
   a first pivotal means rotatable about a vertical axis,
   a second pivotal means connected to said bracket and rotatable with said bracket about a horizontal axis to provide elevational directional movement of said bracket, a handgrip control means, a first movement of which causes the first and second pivotal means to rotate about said vertical axis, causing a camera mountable on said bracket to pan as it moves from one location to another location, and a second movement which causes said second pivotal means to rotate about its horizontal axis, a pair of braking means, one acting on each of the first and second means for stopping the rotational movement of each about its associated vertical and horizontal axes, respectively, and control means mounted on said handgrip control means for selectively controlling each of said pair of braking means.

2. The control device set forth in claim 1 wherein:
said second pivotal means is mounted on said first pivotal means.

3. The control device set forth in claim 1 wherein:
said second pivotal means is mounted on, but spaced from, said first pivotal means.

4. A control device for mounting a camera actuatable by one hand for controlling a plurality of functions comprising:

a mounting bracket for supporting a camera, a first pivotal means rotatable about a vertical axis, means connected to said first pivotal means for adjustably positioning said first pivotal means in one of a number of supporting positions, a second pivotal means connected to said bracket and rotatable with said bracket about a horizontal axis to provide elevational directional movement of said bracket, a strut means for spacedly supporting said second pivotal means on and relative to said first pivotal means, a handgrip control means, a first movement of which causes said first and second pivotal means to rotate about said vertical axis, causing a camera mountable on said bracket to pan as it moves from one location to another location, and a second movement which causes said second pivotal means to rotate about its horizontal axis, a pair of braking means, one acting on each of said first and second pivotal means for stopping the rotational movement of each about its associated vertical and horizontal axes, respectively, and control means mounted on said handgrip control means for selectively controlling each of said pair of braking means.

5. The control device set forth in claim 4 wherein:
said first pivotal means and second pivotal means each incorporates rotational resistance means.

6. The control device set forth in claim 5 wherein:
each of said rotational resistance means comprises a gear train.

7. The control device set forth in claim 1 wherein:
each of said braking means is provided with a pair of brake shoe means for selectively locking said first means and said second means in a given position, first and second solenoids, said first solenoid setting said pair of brake shoe means and said second solenoid releasing said pair of brake shoe means, a transfer switch for alternately energizing said first and second solenoids, said control means comprising a pair of pushbutton switches, each controlling said transfer switch of one of said braking means, and battery means interconnected with said first and second solenoids, said transfer switch and means for alternately energizing said first and second solenoids upon actuation of said transfer switch.

8. The control device set forth in claim 7 wherein:
said control means causes said transfer switch to alternately energize said first and second solenoids of said braking means to alternately set and release said pair of brake shoe means.

9. The control device set forth in claim 7 in further combination with:
a manual override mechanism coupled one to each of said braking means for manually setting and releasing said pair of brake shoe means.

10. The control device set forth in claim 7 in further combination with:
a camera shutter release mechanism comprising a third push-button switch mounted on said handgrip control arm, and means for connecting said third push-button switch to said battery means and to the shutter of an associated camera for actuation thereof.

11. The control device set forth in claim 4 wherein:
said leveling means comprises a tripod at least one leg of which is adjustable for length to level a camera mounted on said base member.

12. The control device set forth in claim 1 wherein:
each of said first and second pivotal means comprises a housing having a stationary part and a movable part, each of said braking means comprises cooperating elements, one element mounted within each of said stationary part, and said movable part of said housing for controlling the movement of the associated first and second means.

* * * * *